United States Patent

Funayama

[11] Patent Number: 6,101,312
[45] Date of Patent: Aug. 8, 2000

[54] AUTOMATIC PICTURE QUALITY CONTROLLER

[75] Inventor: Mitsuo Funayama, Yaita, Japan

[73] Assignee: Sharp Kabushiki Kaisha, Osaka, Japan

[21] Appl. No.: 08/952,747

[22] PCT Filed: Feb. 23, 1996

[86] PCT No.: PCT/JP96/00427

§ 371 Date: Nov. 13, 1997

§ 102(e) Date: Nov. 13, 1997

[87] PCT Pub. No.: WO96/39777

PCT Pub. Date: Dec. 12, 1996

[51] Int. Cl.[7] ............................................. H04N 5/76
[52] U.S. Cl. .................................... 386/93; 386/9
[58] Field of Search .................... 386/46, 93, 9, 386/47, 2, 41, 44, 1, 26; 455/207; 348/607, 678; 360/65, 67

[56] References Cited

U.S. PATENT DOCUMENTS

| | | | |
|---|---|---|---|
| 3,742,361 | 6/1973 | Wason | 455/207 |
| 5,255,126 | 10/1993 | Matsuzawa et al. | 386/93 |
| 5,276,517 | 1/1994 | Matsuzawa et al. | 386/93 |
| 5,296,929 | 3/1994 | Morimoto | 386/93 |
| 5,335,080 | 8/1994 | Park | 386/93 |
| 5,400,149 | 3/1995 | Minakawa | 386/93 |
| 5,416,649 | 5/1995 | McSweeney et al. | 386/93 |
| 5,418,619 | 5/1995 | Wedam et al. | |

FOREIGN PATENT DOCUMENTS

| | | |
|---|---|---|
| 550232 | 4/1993 | European Pat. Off. . |
| 63-133358 | 6/1988 | Japan . |
| 1-296872A | 11/1989 | Japan . |
| 1-303982A | 12/1989 | Japan . |
| 2-68768A | 3/1990 | Japan . |
| 3-209668A | 9/1991 | Japan . |
| 5-12798A | 1/1993 | Japan . |
| 5-143905A | 6/1993 | Japan . |
| 6-325489A | 11/1994 | Japan . |

Primary Examiner—Huy Nguyen

[57] ABSTRACT

An automatic image quality-controlling device, where an FM signal output from a video head is amplified in an AGC amplifier to a uniform amplitude level. A lower-sideband variable peaking amplifier peaks the lower-sideband spectrum of the FM signal at about 1.5 MHz. The lower-sideband is then extracted through a lower-sideband filter. The amplitudes of the lower sideband are converted into a d.c. voltage, which is compared with a reference voltage to output an error voltage to feed back to the lower-sideband variable peaking amplifier so that the ratio between the magnitudes of the carrier wave and the lower-sideband component of the FM signal to be demodulated are constant. As a result, previously jutting amplitudes of the lower-sideband spectrum of an FM signal are uniform to allow optimal S/N value and excellent resolution, thereby producing sharp images.

11 Claims, 13 Drawing Sheets

AUTOMATIC PICTURE QUALITY CONTROLLER

BACKGROUND OF THE INVENTION

1. Field of the Invention

The present invention relates to an automatic image quality-controlling device for use in an FM equalizer in a recording or reproducing circuit for VCRs (video cassette recorders), video-cameras with a built-in VCR (so called camcorder) or the like.

2. Description of the Prior Art

In general, the FM signal used in VCRs (video cassette recorders) or camcorders is composed of a carrier wave and discrete upper and lower frequency bands (lower sideband and upper sideband) from the carrier wave. The frequency range of the carrier wave for the NTSC system is from 3.4 to 4.4 MHz while the frequency range of the carrier wave for the PAL system is from 3.8 to 4.8 MHz. The lower sideband of the signal around 1.5 MHz, governs the resolution of image. When the FM signal of video image is demodulated, the amplitude ratio between the carrier wave and the lower sideband determines the sharpness of the video image. That is, the greater the amplitude of the lower sideband, the clearer the image.

FIG. 1 is a block diagram showing a typical reproducing FM equalizer circuit for conventional VCRs. An FM signal output from a video head 1 is amplified by about 60 dBs in an AGC (automatic gain control) amplifier 2 and the amplified signal is input to a peaking amplifier 3. The frequency characteristics of the video head and video tape decrease with the augmentation of the frequency (see FIG. 2). In order to prevent the occurrence the black-and-white reversal phenomenon and the like, the peaking amplifier 3 subjects the FM signal to a high-frequency compensating peaking treatment as shown by a broken line in FIG. 2. As a result, the output FM signal will have overall frequency characteristics as shown in FIG. 3. This FM signal is input to an FM limiter 4 and then demodulated in an FM demodulator 5. The demodulated signal will be made to undergo a predetermined luminance-signal treatment.

In order to establish the interchangeability between different kinds of apparatuses, it is necessary to secure a margin for preventing the occurrence of the black-and-white reversal phenomenon under the consideration of variations of performances of video tapes used or variations of recording characteristics depending on individual VCRs for tape recording. Therefore, as shown in FIG. 3, the FM signal is emphasized especially in a frequency range of around 5 MHz which governs white display in the luminance signal.

FIG. 4 shows two spectrums of FM signals (as the output signals from the AGC amplifier), one is for a digital signal of the mono-scope pattern etc., and the other is for a typically broadcasted video image. Since the signal of the mono-scope pattern is broadcasted with its lower sideband enhanced, the image is reproduced up to minute part but it will not afford much margins against the black-and-white reversal phenomenon. With regard to the normal image, the signal magnitude is small in the lower sideband, specifically by about 20 dBs at 1.5 MHz as compared to that of the mono-scope pattern. Accordingly, the normal image will present a greater margin for the black-and-white reversal phenomenon.

The characteristic of a reproducing FM equalizer in the VCR is set up such that, for a high-resolution image (a digital image such as of the mono-scope pattern, for instance), the reproduced FM signal is amplified greatly around the frequency range of about 5 MHz that corresponds to white display, in order to inhibit the black-and-white reversal phenomenon from occurring during the demodulation of the reproduced FM signal.

Although this setup inhibits the occurrence of the black-and-white reversal phenomenon in the high-resolution image, the amplitude of the lower sideband becomes relatively low as compared to the amplitude of the carrier wave, thereby the sharpness in the demodulated luminance signal is degraded. On the other hand, as regards the characteristics of video heads as well as video tapes, the noise component increases with the augmentation of the frequency as shown in FIG. 2 and therefore the C/N degrades. As the frequency range (5 MHz) with degraded C/N is made to undergo the peaking treatment, the noise is also enhanced around the peaking range as shown in FIG. 3, thus degrading the S/N of the video output. Since the amplitude of the lower sideband becomes relatively small as compared to the carrier wave, the amplitude of the demodulated luminance signal becomes small in the high-frequency range, as shown in FIG. 5, thus it becomes difficult to produce images with sharpness. Thus, although the FM signal has a relatively great margin against the black-and-white reversal phenomenon, the real situation is such that the sharpness and S/N characteristics in the original signal cannot be utilized efficiently. Further, if a high-resolution reproducing apparatus such as S VHS type apparatuses are used, it is true that the signal is accurately reproduced, but the original source with poor sharpness is reproduced exactly as it is, only to produce unclear images in places of producing a high-resolution image.

SUMMARY OF THE INVENTION

It is therefore an object of the present invention to provide an automatic image quality-controlling device which is set up so that the amplitudes of the lower-sideband spectrum of the FM signal are made uniform at a level which allows an optimum S/N value and the best resolution, thus making it is possible to produce sharp images.

In order to achieve the above object, the first feature of the invention resides in that an automatic image control device includes:

- an AGC amplifier for amplifying an FM signal output from a video head to have a uniform amplitude spectrum;
- a lower-sideband variable-peaking circuit for peaking the lower sideband of the FM signal output from the AGC amplifier;
- a lower-sideband filter for extracting the lower-sideband spectral component from the FM signal which has been subjected to the peaking process;
- a peak detecting circuit for converting the maximum amplitude of the lower-sideband spectral component of the extracted FM signal into a d.c. voltage; and
- a comparator for comparing the obtained d.c. voltage with a reference voltage to output an error voltage, wherein the error voltage output from the comparator is input to the lower-sideband variable-peaking circuit to form a feedback loop so that the amplitudes of the lower-sideband spectrum of the FM signal output from the lower-sideband variable-peaking circuit are made uniform.

In accordance with the second feature of the invention, an automatic image control device includes:

- an AGC amplifier for amplifying an FM signal output from a video head to have a uniform amplitude spectrum;

a lower-sideband variable-peaking circuit for peaking the lower sideband of the FM signal output from the AGC amplifier;

an FM demodulating circuit for demodulating the FM signal which has been subjected to the peaking process;

a luminance signal high-pass filter for extracting the high-frequency spectral component from the luminance signal output from the FM demodulating circuit;

a peak detecting circuit for converting the maximum amplitude of the high-frequency spectral component of the extracted luminance signal into a d.c. voltage; and a comparator for comparing the obtained d.c. voltage with a reference voltage to output an error voltage, wherein the error voltage output from the comparator is input to the lower-sideband variable-peaking circuit to form a feedback loop so that the output spectrum of the luminance signal is made uniform.

In accordance with a third feature of the invention, an automatic image control device having the above first or second feature, further includes a resonant circuit which is composed of a coil, a capacitor and a diode and connected to the lower-sideband variable-peaking circuit, wherein the error voltage output from the comparator is applied to the diode and the amplification factor for the lower sideband is regulated by the varying impedance as the current flowing through the diode changes.

In accordance with the fourth feature of the invention, an automatic image control device includes:

a recording equalizer circuit for regulating an FM signal which has been passed through a limiter so that the recording signal has a predetermined frequency characteristic;

a lower-sideband variable-peaking circuit for peaking the lower sideband of the FM signal output from the recording equalizer circuit;

a lower-sideband filter for extracting the lower-sideband spectral component from the FM signal which has been subjected to the peaking process;

a peak detecting circuit for converting the maximum amplitude of the lower-sideband spectral component of the extracted FM signal into a d.c. voltage; and a comparator for comparing the obtained d.c. voltage with a reference voltage to output an error voltage, wherein the error voltage output from the comparator is input to the lower-sideband variable-peaking circuit to form a feedback loop so that the lower-sideband of the recording FM signal is recorded so as to have a uniform amplitude spectrum.

In accordance with the fifth feature of the invention, an automatic image control device includes:

an AGC amplifier for amplifying an FM signal output from a video head to have a uniform amplitude spectrum;

a first lower-sideband variable-peaking circuit for peaking the lower sideband of the reproduced FM signal output from the AGC amplifier;

a recording equalizer circuit for regulating a recording FM signal which has been passed through a limiter so that the recording signal has a predetermined frequency characteristic;

a second lower-sideband variable-peaking circuit for peaking the lower sideband of the recording FM signal output from the recording equalizer circuit;

a lower-sideband filter for extracting the lower-sideband spectral component from the FM signal input;

a peak detecting circuit for converting the maximum amplitude of the lower-sideband spectral component of the extracted FM signal into a d.c. voltage;

a comparator for comparing the obtained d.c. voltage with a reference voltage to selectively output an error voltage to the first lower-sideband variable-peaking circuit and the second lower-sideband variable-peaking circuit; and switching means disposed between the lower-sideband filter and the first and second lower-sideband variable-peaking circuits, wherein the first lower-sideband variable-peaking circuit is connected with the lower-sideband filter by way of the switching means at the time of the reproducing mode to form a feedback loop while the second lower-sideband variable-peaking circuit is connected with the lower-sideband filter by way of the switching means at the time of the recording mode to form another feedback loop.

In accordance with the sixth feature of the invention, an automatic image control device includes:

an AGC amplifier for amplifying an FM signal output from a video head to have a uniform amplitude spectrum;

an FM demodulating circuit for demodulating the FM signal output from the AGC amplifier;

a luminance-signal high-pass variable-peaking circuit for peaking the high-frequency spectral component of the luminance signal output from the FM demodulating circuit;

a luminance-signal filter for extracting the high-frequency spectral component of the luminance signal which has been subjected to the peaking process;

a peak detecting circuit for converting the maximum amplitude of the extracted luminance signal into a d.c. voltage; and a comparator for comparing the obtained d.c. voltage with a reference voltage to output an error voltage, wherein the error voltage output from the comparator is input to the luminance-signal high-pass variable-peaking circuit to form a feedback loop so that the high-frequency band spectrum of the luminance signal is made uniform.

In accordance with the seventh feature of the invention, an automatic image control device includes:

an AGC amplifier for amplifying an FM signal output from a video head to have a uniform amplitude spectrum;

an FM demodulating circuit for demodulating the FM signal output from the AGC amplifier;

a luminance-signal high-pass variable-peaking circuit for peaking the high-frequency spectral component of the luminance signal output from the FM demodulating circuit;

a luminance-signal high-pass filter for extracting the high-frequency spectral component of the luminance signal from the video signal which has been input to the video input terminal on the VCR side from the video output terminal on the television receiver side;

a peak detecting circuit for converting the maximum amplitude of the extracted luminance signal into a d.c. voltage; and a comparator for comparing the obtained d.c. voltage with a reference voltage to output an error voltage, wherein the error voltage output from the comparator is input to the luminance-signal high-pass variable-peaking circuit to form a feedback loop so that the spectrum of the luminance signal to be reproduced on the television receiver is made uniform.

In accordance with the eighth feature of the invention, an automatic image control device includes:

an AGC amplifier for amplifying an FM signal output from a video head to have a uniform amplitude spectrum;

a lower-sideband variable-peaking circuit for peaking the lower sideband of the FM signal output from the AGC amplifier;

a lower-sideband filter for extracting the lower-sideband spectral component from the FM signal output from the AGC amplifier;

a peak detecting circuit for converting the maximum amplitude of the extracted lower-sideband spectral component into a d.c. voltage; and a comparator for comparing the obtained d.c. voltage with a reference voltage to output an error voltage, wherein the error voltage output from the comparator is input to the lower-sideband variable-peaking circuit and the lower-sideband amplitude of the FM signal output from the lower-sideband variable-peaking circuit is regulated in accordance with the lower-sideband amplitude of the FM signal output from the AGC amplifier.

In accordance with the ninth feature of the invention, an automatic image control device having the first feature, further includes: an envelope detecting circuit for detecting the envelope of the voltage of the FM signal output from the video head, wherein the d.c. voltage output from the peak detecting circuit is overlaid with the envelope-detected voltage output from the envelope detecting circuit.

In accordance with the tenth feature of the invention, an automatic image control device having the first feature, further includes: an envelope detecting circuit for detecting the envelope of the voltage of the FM signal output from the video head; and an inverting circuit for inverting the envelope-detected voltage output from the envelope detecting circuit, wherein the reference voltage output from the comparator is overlaid with an inverted signal of the envelope-detected voltage output from the inverter circuit.

In accordance with the eleventh feature of the invention, an automatic image control device includes:

an AGC amplifier for amplifying an FM signal output from a video head to have a uniform amplitude spectrum;

a peaking circuit for peaking a frequency band range corresponding to white display of the luminance signal in the FM signal output from the AGC amplifier;

a lower-sideband filter for extracting the lower-sideband component of the FM signal output from the AGC amplifier;

a gain control amplifier which allows the extracted lower-sideband component of the FM signal to be varied by control of voltage;

a mixing circuit for mixing the gain-controlled lower-sideband component of the FM signal with the output from the peaking circuit;

a lower-sideband filter for extracting lower-sideband component from the output from the mixing circuit;

a peak detecting circuit for converting the maximum amplitude of the lower-sideband spectral component extracted through the lower-sideband filter into a d.c. voltage; and a comparator for comparing the obtained d.c. voltage with a reference voltage to output an error voltage, wherein the error voltage output from the comparator is used to control the gain control amplifier to thereby regulate the lower-sideband spectrum of the FM signal to be passed through a limiter at an approximately uniform level.

In the above first feature of the invention, an FM signal output from a video head is amplified the an AGC amplifier to have a uniform amplitude spectrum and the amplified signal is input to the lower-sideband variable-peaking circuit, which is a circuit for peaking the lower sideband spectrum around, for example, 1.5 MHz to be controlled by the d.c. voltage. The output is demodulated to be subjected to a prescribed-luminance signal treatment. The peaking output is processed through the filter and peak detecting circuit for detecting the amplitudes of the lower sideband so that the maximum amplitude is converted into a d.c. voltage. This d.c. voltage is supplied to the lower-sideband variable-peaking amplifier to form a feedback loop. Thus, the FM signal is automatically controlled so that the amplitudes of the lower-sideband spectrum of the FM signal are made uniform, whereby the ratio between the magnitudes of the carrier wave and the lower sideband component of the FM signal is controlled to be constant, to thereby realize a sharp image display.

In the above second feature of the invention, the device is configurated such that the luminance signal demodulated in the FM demodulator is negatively fed back to the lower-sideband variable-peaking circuit. This luminance signal is supplied to the luminance signal high-pass filter made up of a high-pass filter or band-pass filter for extracting a frequency range of around 2 MHz. Then, similarly to the first feature of the invention, the output from the luminance signal high-pass filter is converted into a d.c. voltage in the peak detecting circuit. The d.c. voltage is compared with a reference voltage to produce an error voltage, which in turn is negatively feedback to the lower-sideband variable-peaking circuit. Thus, the error voltage changes the peaking quantity for the lower sideband and consequently, the output spectrum of the luminance signal is made uniform, whereby it is possible to attain the same effects as in the first feature of the invention.

In the above third feature of the invention, the lower-sideband variable-peaking circuit of the first or second feature of the invention is connected with a resonant circuit composed of a coil, a capacitor and a diode. The values of the coil and capacitor are adjusted so as to control the frequency component maximally amplified by the lower-sideband variable-peaking circuit. The output from the comparator is input to the diode. The amplification factor for the lower sideband is regulated by the varying impedance as the current flowing through the diode changes.

In the above fourth feature of the invention, the recording FM signal which has been subjected to the limiter is input to the recording equalizer where the recording signal is shaped to have a predetermined frequency characteristic. The signal, after passing through the lower-sideband variable-peaking circuit, is recorded with the video head. The output signal from the lower-sideband variable-peaking circuit is passed through the filter and the peak detecting circuit to be converted to a d.c. voltage. The d.c. voltage is negatively fed back to the lower-sideband variable-peaking circuit. As described, since the output from the lower-sideband variable-peaking circuit is operated so that the d.c. voltage supplied to the comparator may be equal to the reference voltage, it is possible to automatically regulate the amplitudes of the frequency spectrum of the lower sideband with some particularly jutting amplitudes to a uniform level.

In the above fifth feature of the invention, a series of the lower-sideband filter, peak detecting circuit and comparator as described above is connected via switching means for switching the operation between the reproducing and recording modes, to both the first lower-sideband variable-peaking amplifier in the reproducing circuit and the second lower-sideband variable-peaking amplifier in the recording circuit on their output sides. In the reproducing mode, the switching means connects the first lower-sideband variable-peaking amplifier with the lower-sideband filter. In the recording mode, the switching means connects the second lower-sideband variable-peaking amplifier with the lower-sideband filter. As a result, it is possible in either reproducing or recording mode to automatically regulate the amplitudes of the frequency spectrum of the lower sideband with some particularly jutting amplitudes to a uniform level.

In the above sixth feature of the invention, the demodulated luminance signal is input to the high-frequency variable-peaking amplifier where the high-frequency part is subjected to peaking. The output from the amplifier will be subjected to a prescribed signal processing operation. The output signal from the amplifier is also passed through the luminance signal high-pass filter, peak detecting circuit and comparator so as to be negatively fed back to the high-frequency variable-peaking amplifier. The luminance signal high-pass filter detects the high-frequency component of the luminance signal. The peak detecting circuit converts the maximum of the detected signal into a d.c. voltage. The comparator compares the d.c. voltage with a reference voltage to produce an error voltage. The error voltage is fed back to the luminance-signal high-pass variable-peaking circuit so that the spectrum in the high-frequency range of the luminance signal can be regulated to be uniform.

In the above seventh feature of the invention, the output from the luminance-signal high-frequency variable-peaking circuit is supplied to the luminance-signal high-pass filter where the high frequency spectral component of the luminance signal is extracted to be regulated at a substantially uniform level. The output from the luminance-signal high-pass filter is input to the peak detecting circuit where the maximum amplitude of the frequency spectral component is converted into a d.c. voltage. The d.c. voltage is input to the comparator where the d.c. voltage is compared with a reference voltage to produce an error voltage. The error voltage is negatively fed back to the high-frequency variable-peaking amplifier. Thus, in order to prevent the occurrence of the overshoot or ringing, the spectrum of the luminance signal to be reproduced in the television receiver is made uniform by adapting the characteristics of the video image in the video recording/reproducing apparatus, specifically increasing or decreasing the frequency characteristic in the high-frequency range, in conformity with to the characteristics of the television receiver.

In the above eighth feature of the invention, the output from the AGC amplifier is input to the lower-sideband filter where the amplitudes of the frequency spectral component in the range below the frequency of the carrier wave of the FM signal are regulated at a substantially uniform level. The output from the lower-sideband filter is input to the peak detecting circuit where the maximum amplitude of the frequency spectral component is converted into a d.c. voltage. The d.c. voltage is input to the comparator where the d.c. voltage is compared with a reference voltage to produce an error voltage. The error voltage is supplied to the lower-sideband variable-peaking circuit. As a result, the amplitudes of the lower sideband spectrum of the output from the AGC amplifier is regulated so that the d.c. voltage input to the comparator may be equal to the reference voltage. Therefore, it is possible to automatically regulate the amplitudes of the frequency spectrum of the lower sideband with some particularly jutting amplitudes to a uniform level.

In the above ninth feature of the invention, the output signal from the video head is supplied to the envelope detecting circuit. The thus detected signal is overlaid with the output from the peak detecting circuit. Accordingly, the amplification factor for the lower-sideband can be in conformity with the level of the envelope-detecting voltage. That is, it is possible to vary the amplification factor for the lower-sideband in response with the level of the reproduction output from the video head.

In the above tenth feature of the invention, although the reference voltage into the comparator is varied in conformity with the envelope-detected voltage, the same effect obtained in the ninth feature of the invention can be attained by inverting the envelope-detected voltage.

In the above eleventh feature of the invention, the lower-sideband of the FM signal output from the AGC amplifier is extracted using the lower-sideband filter. The thus extracted signal is supplied to the gain control amplifier where the amplitudes of the lower-sideband spectrum are controllably varied by the voltage control. In this operation, the level of the amplitudes is set at a level just below the threshold above which the black-and-white reversal will occur. The thus gain-controlled lower sideband is mixed in the mixing circuit with the output from the peaking amplifier. The lower-sideband is extracted from the mixer output by the lower-sideband filter and supplied to the peak detecting circuit where the maximum amplitude of the extracted lower-sideband spectrum is converted into a d.c. voltage. The obtained d.c. voltage is compared with a reference voltage in the comparator to output an error voltage. This error voltage being output from the comparator is adapted to control the gain control amplifier. Thus, the lower-sideband spectrum of the input FM signal is regulated to a substantially uniform level so as to make the Q-factor of the resonance circuit unchanged. Accordingly, it is possible to prevent the occurrence of the sharp rise of the signal level only at a local frequency.

DESCRIPTION OF THE PREFERRED EMBODIMENTS

Embodiments of the invention will hereinafter be described with reference to the accompanying drawings.

Embodiment 1

Figure 6:
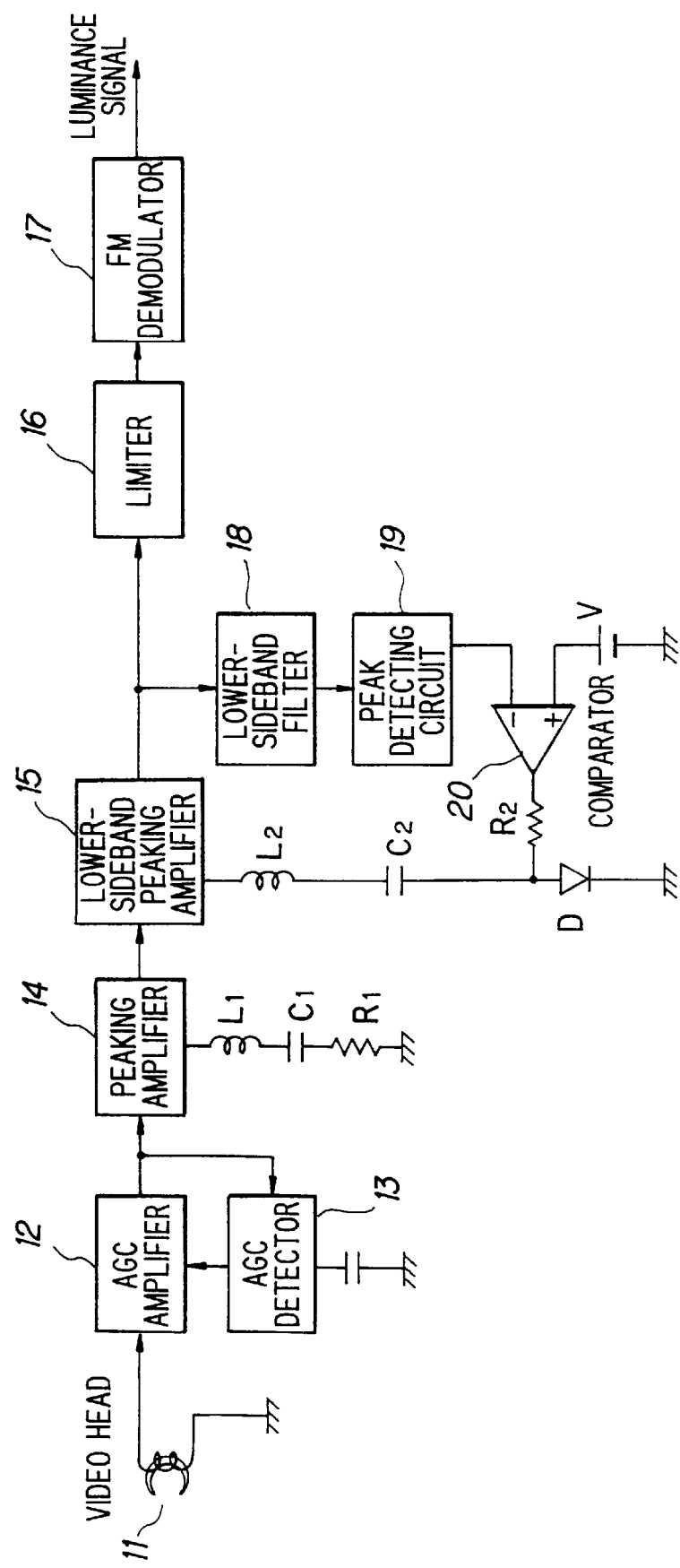
FIG. 6 is a block diagram showing a first embodiment of an automatic image quality-controlling device in accordance with the invention.

FIG. 6 is a block diagram showing a first embodiment of an automatic image quality-controlling device in accordance with the invention. In the figure, a video head 11 outputs an FM signal containing low-frequency range conversion color information. This FM signal is amplified in an AGC amplifier 12 by, for example, about 60 dBs so that the signal to be output has a uniform amplitude level. This output is supplied to a peaking amplifier 14 and to an AGC detecting circuit 13. The AGC amplifier 12 and AGC detecting circuit 13 form a loop so that the maximum amplitude of the FM signal will control the frequency range (3.8 MHz for the PAL system, 3.4 MHz for NTSC system) that corresponds to the synchronizing signal portion of the luminance signal to have a uniform amplitude spectrum.

Figure 1:
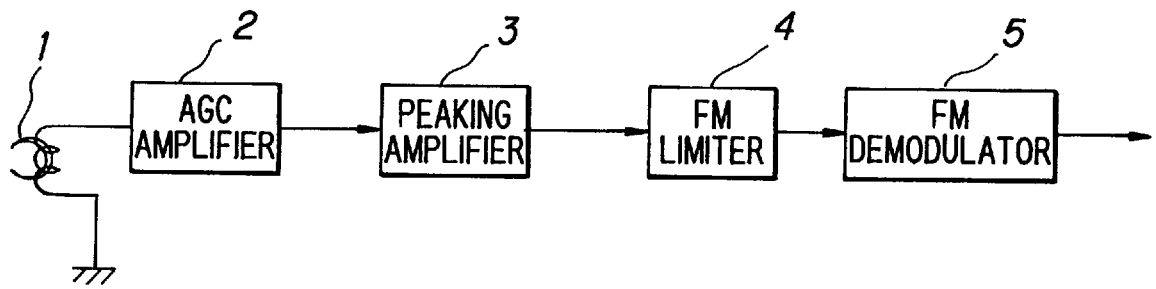
FIG. 1 is a block diagram showing an example of a conventional reproducing FM equalizer circuit.
Figure 2:
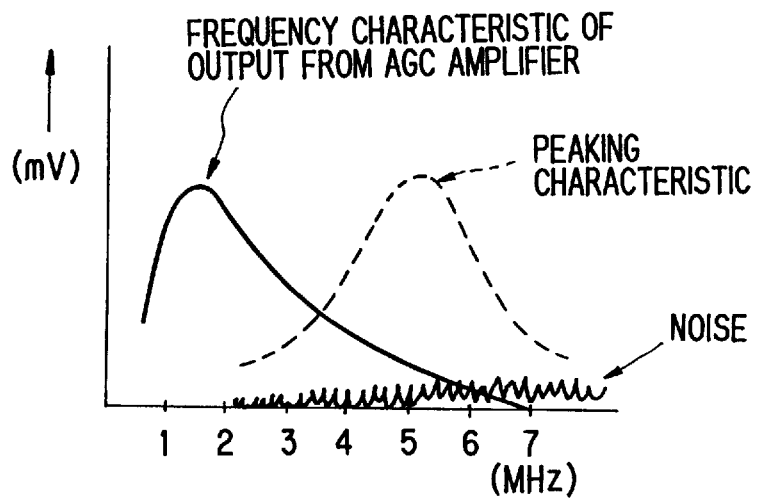
FIG. 2 is a characteristic chart showing frequency characteristics of an FM signal.
Figure 3:
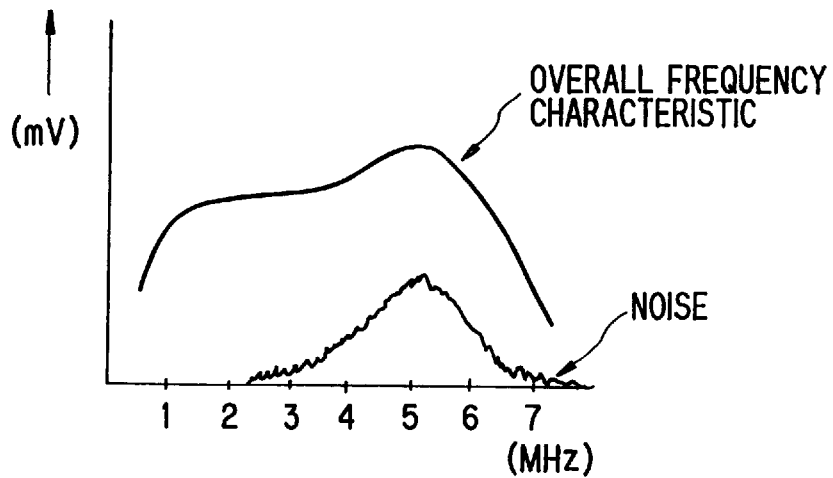
FIG. 3 is a characteristic chart showing an overall frequency characteristics of an FM signal after a peaking treatment.
Figure 4:
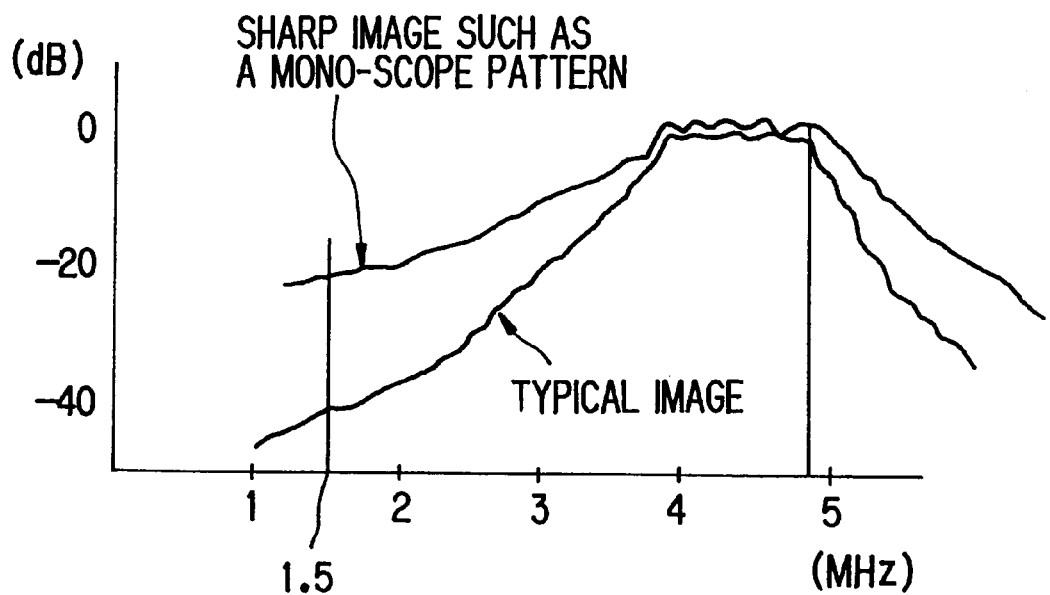
FIG. 4 is a characteristic chart showing spectrums of image signals.
Figure 5:
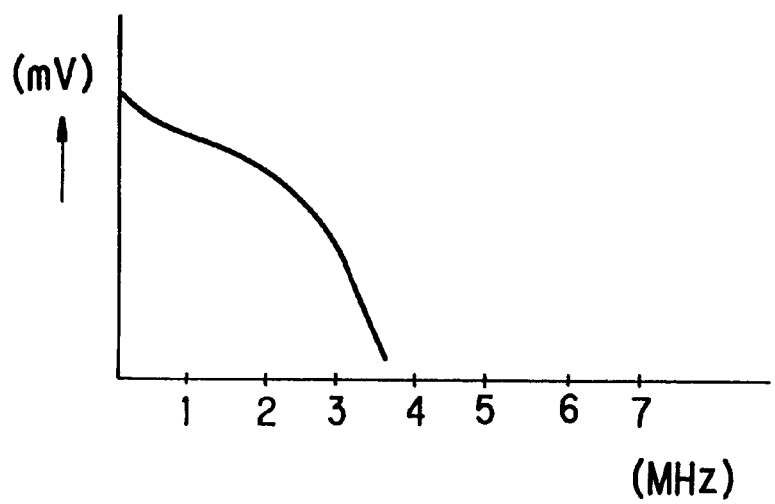
FIG. 5 is characteristic chart showing frequency characteristics of the luminance signal.
Figure 7:
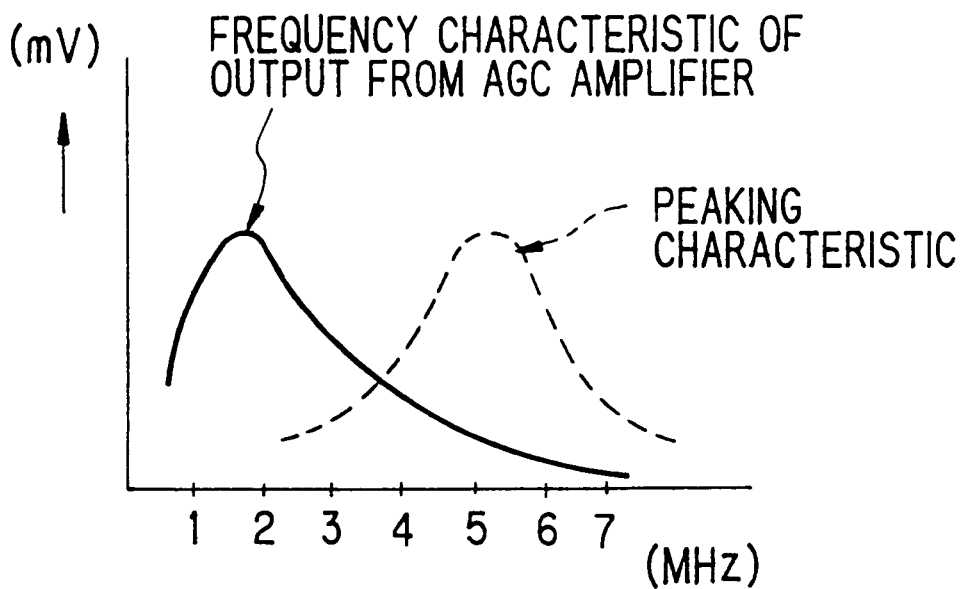
FIG. 7 is a characteristic chart showing frequency characteristics of an FM signal.

The FM signal output from AGC amplifier 12 has a frequency characteristic as shown in FIG. 7, in which the output power decreases as the frequency becomes high. This feature is liable to cause the black-and-white reversal phenomenon. To avoid this, the peaking amplifier 14 is adapted to peak the spectrum of the output signal around 5 MHz as indicated by the broken line in FIG. 2, to prevent the occurrence of the black-and-white reversal phenomenon which tends to occur when the luminance signal transits from black to white display. Here, the peaking amplifier 14 is connected with a coil $L_1$, a capacitor $C_1$ and a resistor $R_1$ in order to allow the peaking frequency to be set at around 5 MHz.

The output from the peaking amplifier 14 is supplied to the lower-sideband variable-peaking amplifier 15 where the signal is peaked on the lower-sideband range at around 1.5 MHz. The output from the lower-sideband variable-peaking amplifier 15 is then limited by an FM limiter circuit 16 thereafter, the signal is passed through an FM demodulator 17 to be output to a next stage where the signal is subjected to a prescribed luminance-signal process.

Figure 8:
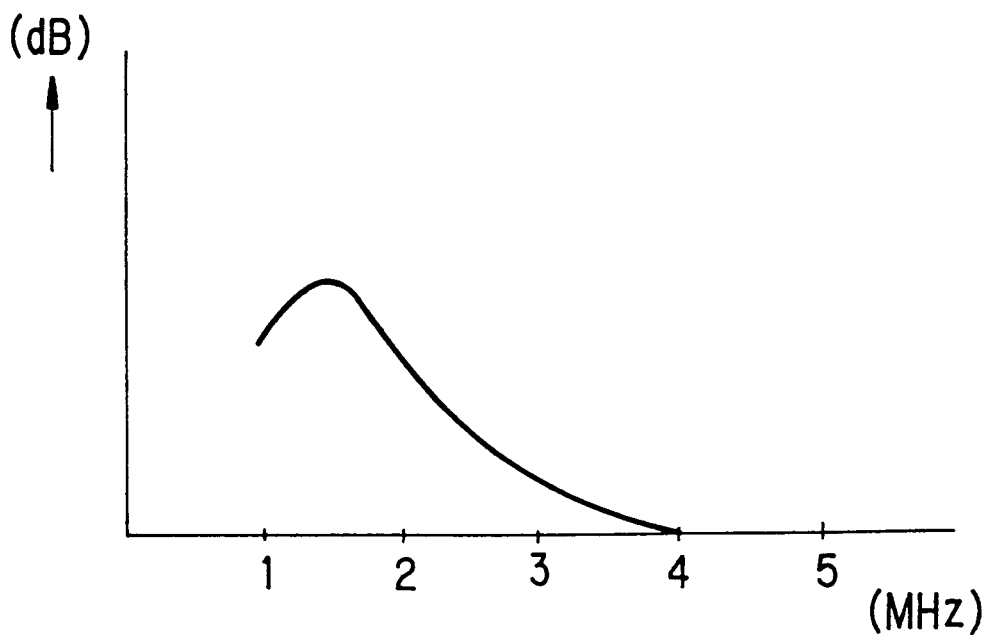
FIG. 8 is a characteristic chart showing frequency characteristics of a lower-sideband filter.
Figure 9:
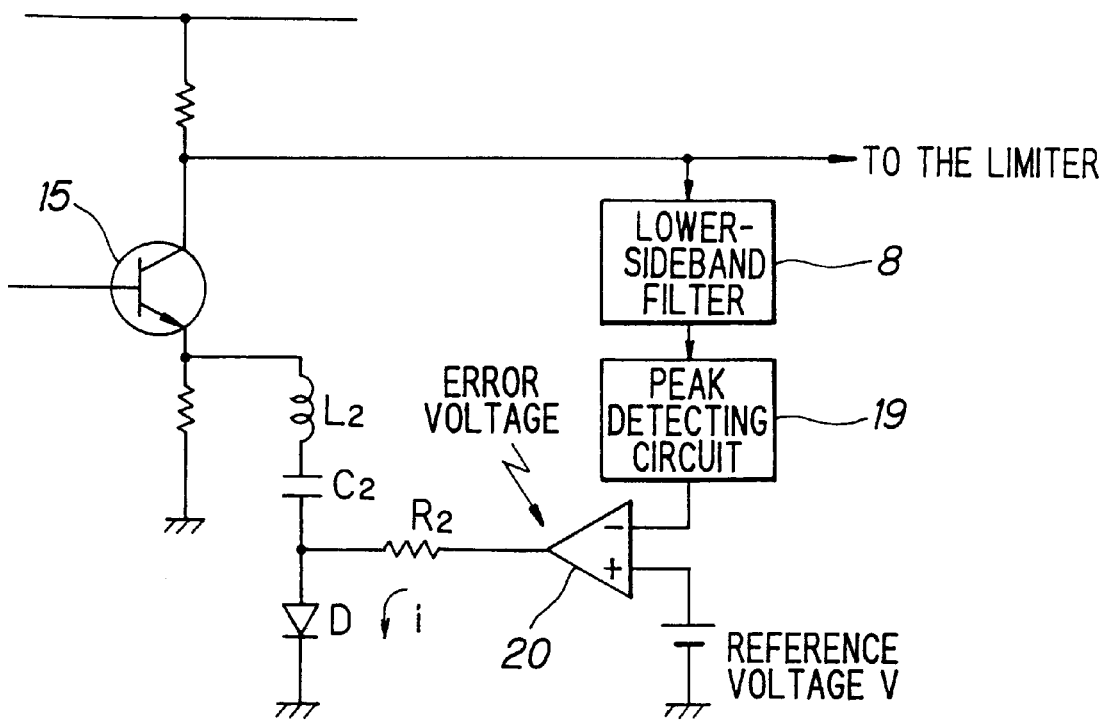
FIG. 9 is a block diagram showing a feedback circuitry to a variable-peaking amplifier for lower sideband.
Figure 10:
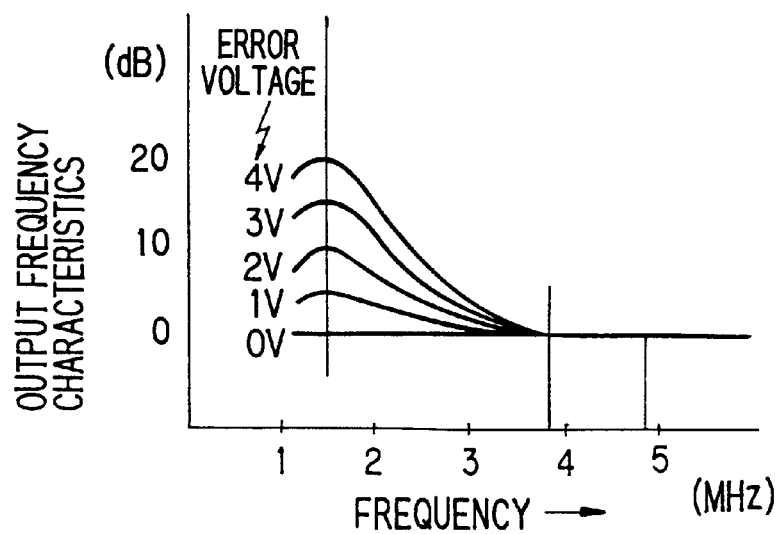
FIG. 10 is a characteristic chart showing frequency characteristics for different error voltages from a comparator.

At the same time, the other output from the lower-sideband variable-peaking amplifier 15 is input to a lower-sideband filter 18 made up of a low-pass filter or band-pass filter having a frequency characteristic shown in FIG. 8, through which the frequency spectral component below the carrier wave of the FM signal is extracted and the amplitudes of the extracted spectral component are adjusted to substantially the same level. The output from the lower-sideband filter 18 is input to a peak detecting circuit 19 where the maximum amplitude of the frequency spectral component is converted into a d.c. voltage. This d.c. voltage is input to a comparator 20 where the signal is compared to a reference voltage V so as to produce an error voltage. The lower-sideband variable-peaking amplifier 15 is connected with a coil $L_2$, a capacitor $C_2$ and a diode D in this order to construct a resonant circuit. Here, in the lower-sideband variable-peaking amplifier 15, it is possible to set up and control the frequency to be amplified, by adjusting the values of the coil $L_2$ and the capacitor $C_2$. The error voltage is applied to the aforementioned diode D via a register $R_2$ so as to form a negative feedback loop to the lower-sideband variable-peaking amplifier 15. This negative feedback circuitry is shown in FIG. 9. The error voltage from the comparator 20 applied causes a current ι to flow from the comparator 20 into the diode D whereby the impedance varies. That is, the circuit is constructed such that the peaking quantity for the lower-sideband range around 1.5 MHz can be varied in response to the error voltage. (see FIG. 10).

As a result, the output from the lower-sideband variable-peaking amplifier is adjusted so as to be equal to the d.c. voltage input to the comparator. Therefore, if there are some particularly jutting amplitudes in the frequency spectrum in the lower sideband, they are automatically regulated to a uniform level. Thus, the amplitude ratio between the carrier wave and the lower sideband is made constant to thereby attain improved sharpness of image.

Due to the difference in recording characteristics of individual VCRs or due to the difference in output characteristics of individual video tapes, some recorded images may be reproduced clearly, other may be reproduced blurred. However, in this embodiment, upon the reproduction of images, clearly recorded information can be reproduced as a clearer image while a little unclearly or soft recorded information will also be reproduced as a clear image. This is because that 1) the FM outputs from these recorded tapes are automatically adjusted to an FM characteristic having a uniform sprious; and 2) there is no need for the FM equalizer to secure a margin in its characteristics for preventing the black-and-white reversal as used to be required in the conventional apparatus. Further, since the reproduction of the information on the video tape is subjected to the peaking operation in the lower frequency band in which C/N presents good performances, this feature also betters the S/N ratio.

Embodiment 2

Figure 11:
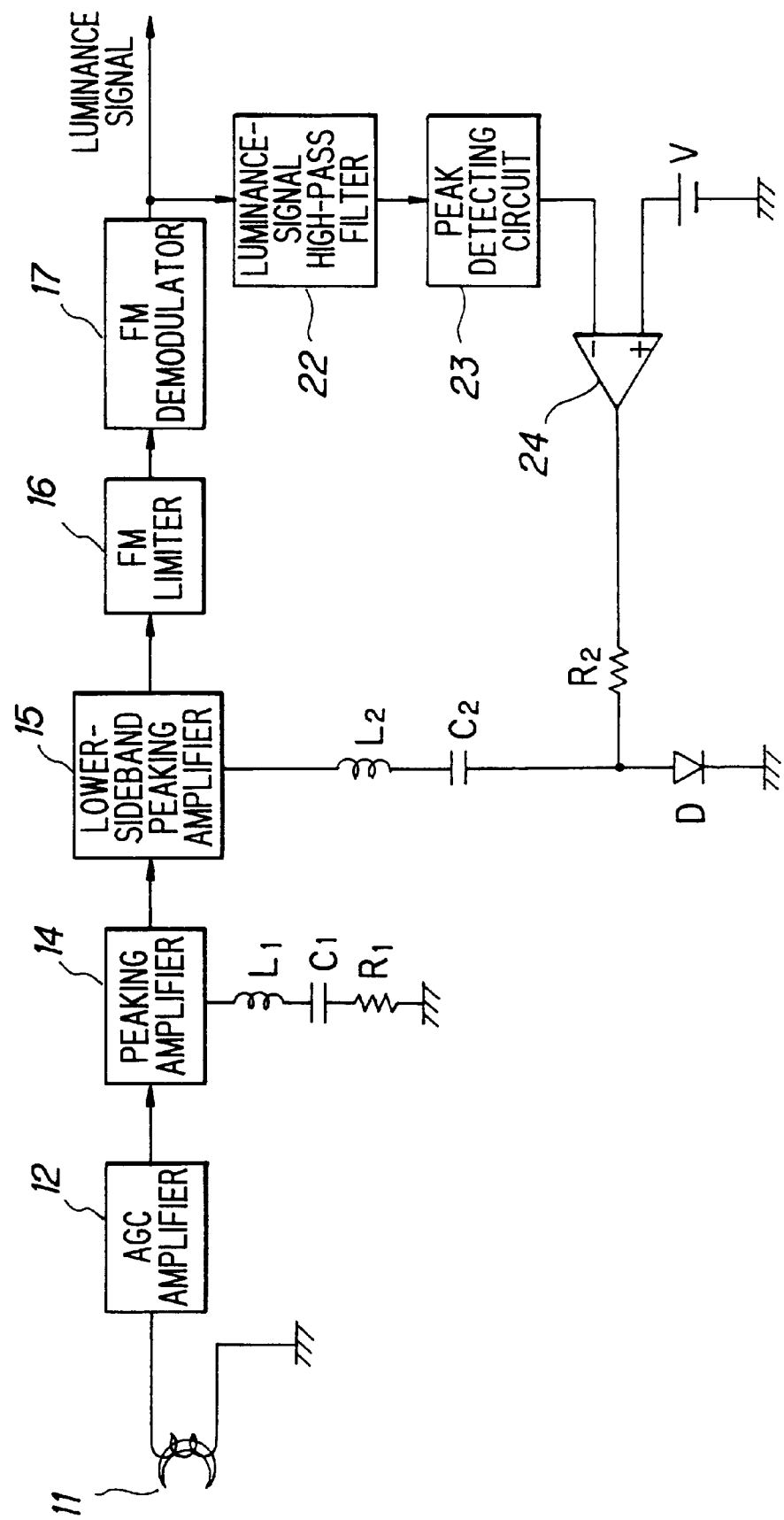
FIG. 11 is a block diagram showing a second embodiment of an automatic image quality-controlling device in accordance with the invention.

FIG. 11 is a block diagram showing a second embodiment in accordance with the invention. This embodiment is characterized by arranging a luminance signal high-pass filter 22, a peak detecting circuit 23 and a comparator 24 on the output side of an FM demodulator 17 so as to form a negative feedback loop to a lower-sideband variable-peaking amplifier 15.

That is, as in the first embodiment, an FM signal as the output from a video head 11 is passed through an AGC amplifier 12, a peaking amplifier 14, the lower-sideband variable-peaking amplifier 15 and an FM limiter 16 to be input to the FM demodulator 17 where the input signal is demodulated into the luminance signal to be output. This luminance signal is input to the luminance signal high-pass filter 22 made up of a high-pass filter or band-pass filter for extracting a frequency range of around 2 MHz. The output from the luminance signal high-pass filter 22 is input to the peak detecting circuit 23 where the maximum amplitude of the frequency spectral component is converted into a d.c. voltage. This d.c. voltage is input to a comparator 24 where the signal is compared to a reference voltage V so as to produce an error voltage. The lower-sideband variable-peaking amplifier 15 is connected with a coil $L_2$, a capacitor $C_2$ and a diode D in this order to construct a resonant circuit. The error voltage is applied to the anode of the aforementioned diode D via a register $R_2$ so as to form a negative feedback loop to the lower-sideband variable-peaking amplifier 15.

As in the first embodiment, the values of the coil $L_2$ and capacitor $C_2$ are adjusted so as to set up a peaking frequency at around 1.5 MHz. The error voltage similarly causes the impedance of the diode D to vary to thereby change the peaking quantity for the lower-sideband range around 1.5 MHz. As a result the output spectrum of the luminance signal can be made uniform, whereby it is possible to attain the same effects as in the first embodiment.

Embodiment 3

Figure 12:
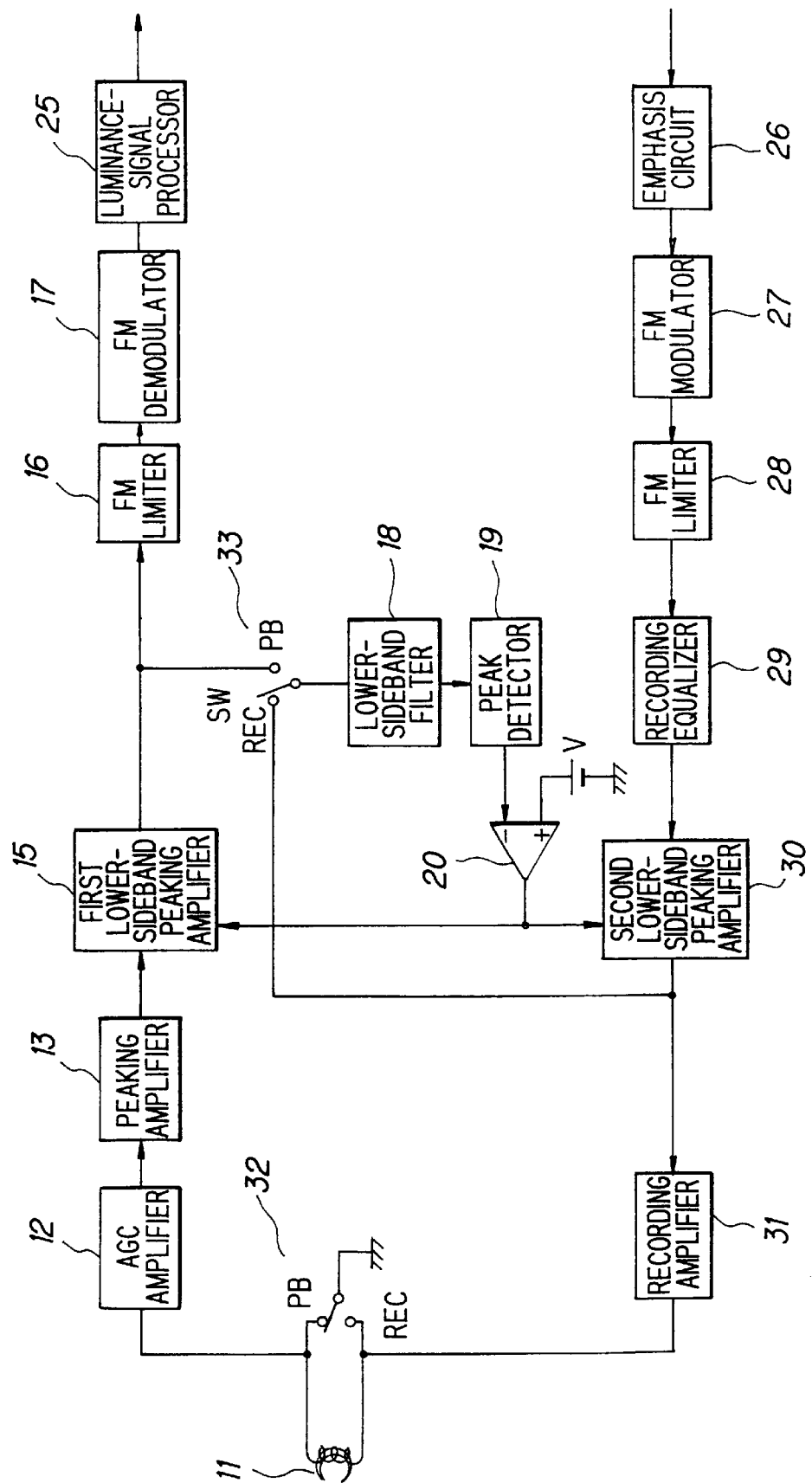
FIG. 12 is a block diagram showing a third embodiment of an automatic image quality-controlling device in accordance with the invention.

FIG. 12 is a block diagram showing a third embodiment of an automatic image quality-controlling device in accordance with the invention. This automatic image quality-controlling device is composed of recording and reproducing parts. In the figure, a video head 11 is connected with a changeover switch 32 for switching the operation between the playback (PB) mode and the recording (REC) mode. The recording part is composed of, as in the first embodiment, an AGC amplifier 12, a peaking amplifier 13, a first lower-sideband variable-peaking amplifier 15, an FM limiter circuit 16 and an FM demodulator 17, where an FM signal is demodulated to be output to a luminance signal processing circuit 25 so that a prescribed process is carried out.

With regard to the recording part, the video signal is input to an emphasis circuit 26 where the high-frequency component is emphasized. Then the signal is modulated in an FM modulating circuit 27. Further, the signal is limited by an FM limiter circuit 28 and then input to an recording equalizer circuit 29 where the signal is modified so as to have a predetermined frequency characteristic. Thereafter the signal is passed through a second lower-sideband variable-peaking amplifier 30 and a recording amplifier 31 to be recorded by the video head 11.

Connected to both the first and second lower-sideband variable-peaking amplifiers 15 and 30 on their output sides is a series of a lower-sideband filter 18, a peak detecting circuit 19 and a comparator 20 as described in the first embodiment via a changeover switch 33 for switching the operation between the reproducing and recording modes. The output from the comparator 20 is input to the first or second lower-sideband variable-peaking amplifiers 15 and 30. That is, the output signal from the first or second lower-sideband variable-peaking amplifiers 15, 30 is negatively fed back through the above series to the first or second lower-sideband variable-peaking amplifiers 15, 30.

In the reproducing mode, the changeover switch 32 and 33 are connected to their reproducing mode (PB) terminals, respectively. The thus formed circuit effects the same operation as the circuit described in the first embodiment. That is, the output from the first lower-sideband variable-peaking amplifier 15 is processed through the lower-sideband filter 18 and peak detecting circuit 19 to produce a d.c. voltage. The comparator 20 compares the d.c. voltage with a reference voltage V to produce an error voltage. This error voltage is negatively fed back to the first lower-sideband variable-peaking amplifier 15. In response to the error voltage, the peaking quantity around the 1.5 MHz (in the lower sideband) is varied.

On the other hand, in the recording mode, the changeover switch 32 and 33 are connected to their recording mode (REC) terminals, respectively. The output from the second lower-sideband variable-peaking amplifier 30 is processed through the lower-sideband filter 18, peak detecting circuit 19 and comparator 20 to form a negative feedback loop. Therefore, as in the reproducing mode, the peaking quantity around the 1.5 MHz in the lower sideband is varied in response to the error voltage from the comparator 20.

In this way, the output from the first or second lower-sideband variable-peaking amplifier 15, 30 is adjusted so as to be equal to the d.c. voltage input to the comparator 20. Therefore, if there are some particularly jutting amplitudes of the frequency spectrum of the lower sideband, they are automatically regulated to a uniform level. Thus, in the reproducing mode, the amplitude ratio between the carrier wave and the lower sideband is made constant as in the first embodiment to thereby reproduce images at a high resolution. In the recording mode, it is possible to record a high-resolution signal whatever content the video image has.

Embodiment 4

Figure 13:
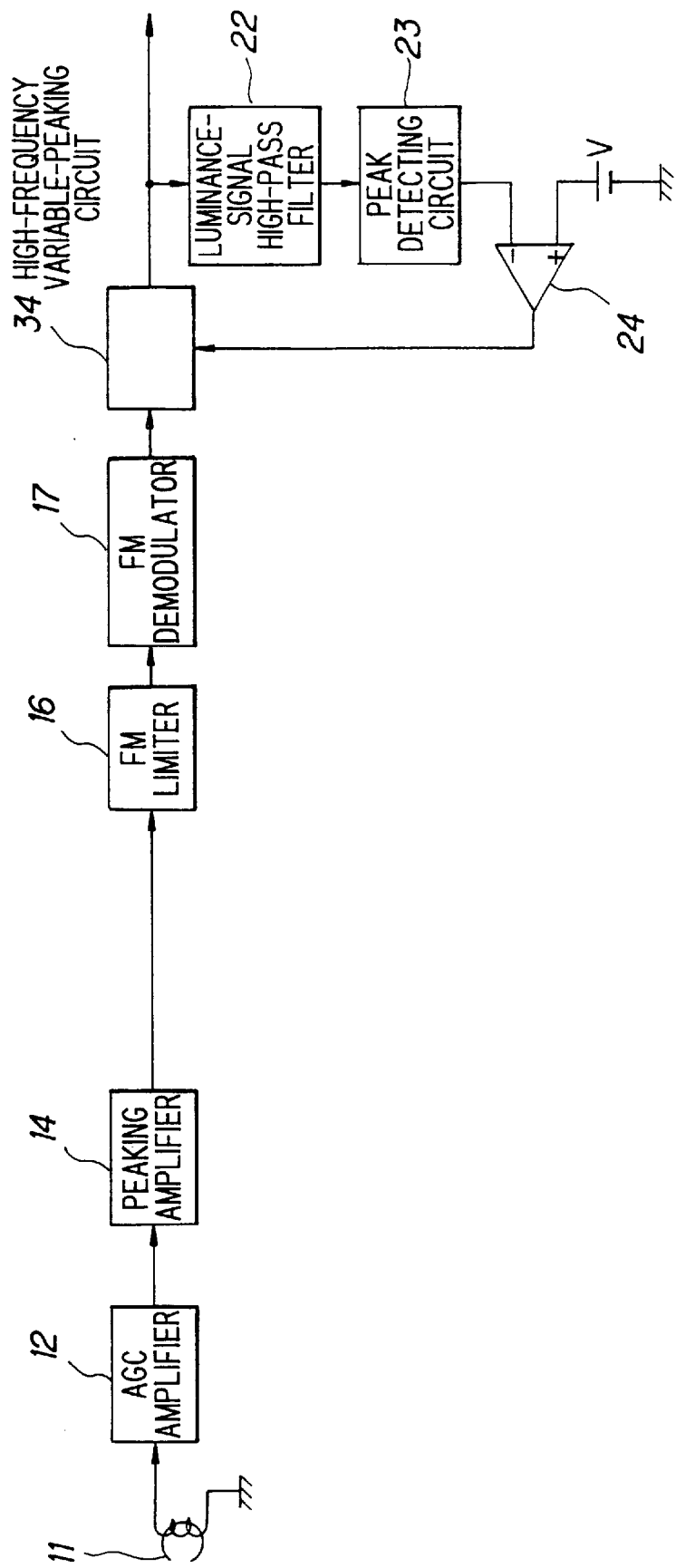
FIG. 13 is a block diagram showing a fourth embodiment of an automatic image quality-controlling device in accordance with the invention.

FIG. 13 is a block diagram showing a fourth embodiment of an automatic image quality-controlling device in accordance with the invention. In the figure, an FM signal as the output from a video head 11 is passed through an AGC amplifier 12, a peaking amplifier 14, an FM limiter 16 and an FM demodulator 17 so that the input signal is demodulated into the luminance signal. The demodulated luminance signal is input to a high-frequency variable-peaking amplifier 34 where the high-frequency part is subjected to peaking. The output from the amplifier 34 is then subjected to a prescribed signal processing operation after the next stage. The output signal from the amplifier 34 is also passed through a luminance signal high-pass filter 22, a peak detecting circuit 23 and a comparator 24 to form a negative feedback loop to the high-frequency variable-peaking amplifier 34.

This circuit operates as follows: the luminance signal high-pass filter 22 detects the high-frequency component of the luminance signal; the peak detecting circuit 23 converts the maximum of the detected signal into a d.c. voltage; and the comparator 24 compares the d.c. voltage with a reference voltage V to produce an error voltage. This error voltage is fed back to the luminance-signal high-pass variable-peaking circuit 34 so that the spectrum in the high-frequency range of the luminance signal can be regulated to be uniform. Thus, the high-frequency component of the luminance signal which is easy to degrade may be compensated, whereby it is possible to produce sharp images.

Embodiment 5

The quality of video image is determined by the characteristics of a television receiver used and overall characteristics of the system. It might be considered that an excellent image of a high resolution can be obtained if both the television receiver and the video recording/reproducing apparatus are capable of producing high quality of image. In practice, however, the overshoot, ringing etc., occur in the composite system to unexpectedly cause degradation of the quality of image. To deal with such effects, this embodiment is characterized in that the spectrum of the video signal in the television receiver is detected to control the frequency characteristics of the video image, to thereby obtain improved quality of image.

Figure 14:
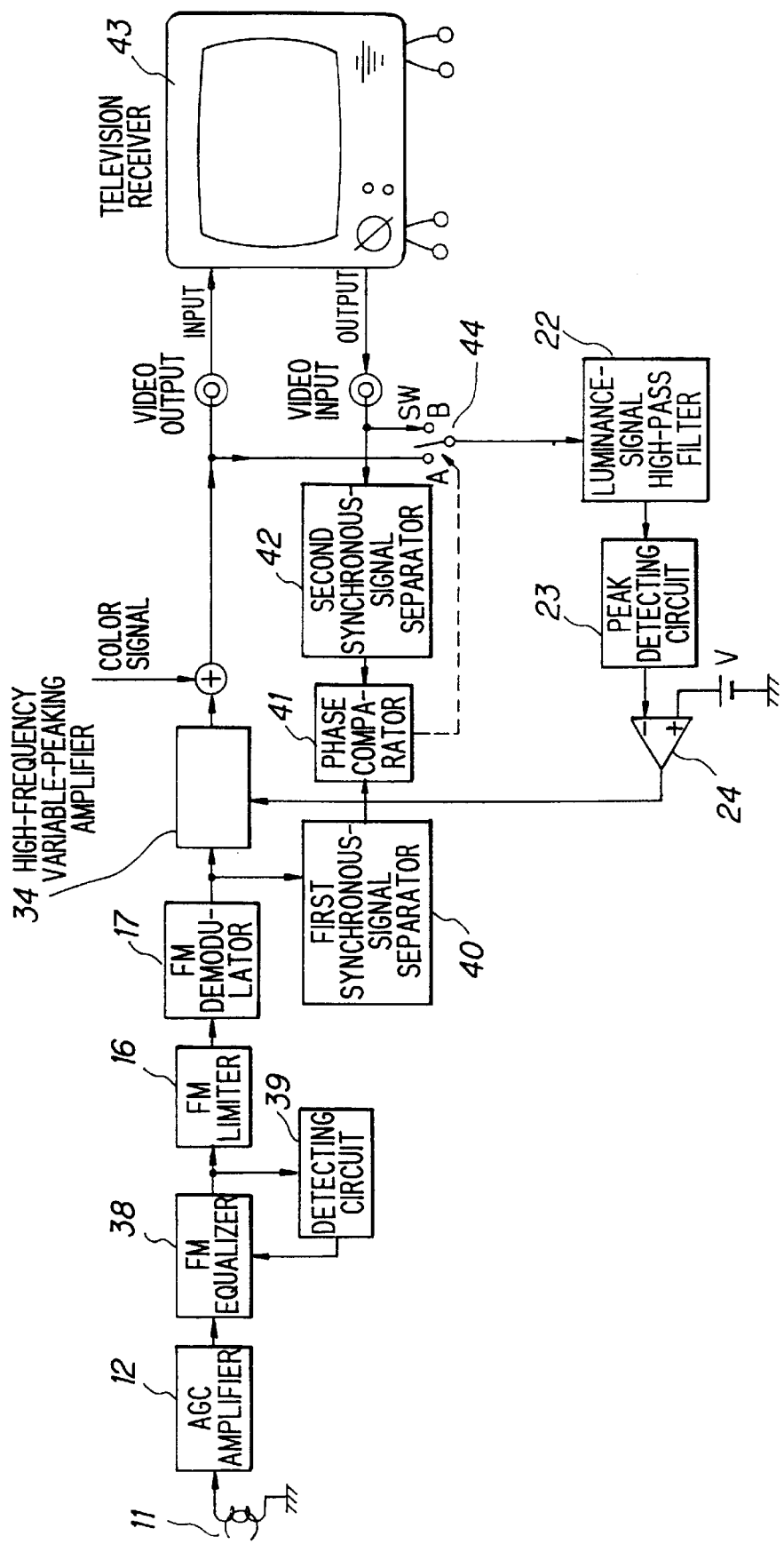
FIG. 14 is a block diagram showing a fifth embodiment of an automatic image quality-controlling device in accordance with the invention.

FIG. 14 is a block diagram showing a fifth embodiment of an automatic image control device in accordance with the invention. In the figure, the output signal from the a video head 11 is amplified in an AGC amplifier 12 to a uniform amplitude level. Then the amplified signal is supplied to an FM equalizer circuit 38 made up of a peaking amplifier and a lower-sideband variable-peaking amplifier. The output signal from the FM equalizer circuit 38 is processed through an FM limiter circuit 16 and an FM demodulator 17 to thereby be output as the demodulated signal. The output from the FM equalizer circuit 38 is also supplied to a detecting circuit 39 made up of a lower-sideband filter, a peak detecting circuit and a comparator to form a negative feedback loop to the FM equalizer circuit 38. The FM equalizer circuit 38 and the detecting circuit 39 have the same configurations and functions as the circuits described in the first embodiment.

The luminance signal output from the FM demodulating circuit 17 is subjected to the peaking treatment as to the high-frequency range by the high-frequency variable-peaking amplifier 34 and then the output signal is mixed with the color signal to be output to a television receiver 43. The luminance signal output from the FM demodulating circuit 17 is also supplied to a first synchronous-signal separating circuit 40 where synchronous signal is separated from the luminance signal. The video signal output from the television receiver is supplied to a second synchronous-signal separating circuit 42 where the synchronous signal is separated from the luminance signal. The thus separated synchronous signal in the video recording/reproducing apparatus and the synchronous signal from the television receiver are compared as to their phases in a phase comparing circuit 41. When the two synchronous signals are in phase, a changeover switch 44 is set at B so that the video image output from the television receiver 43 is supplied to a luminance-signal high-pass filter 22 made up of a high-pass filter or band-pass filter, so that the high-frequency spectral component of the luminance signal is extracted. The output from the luminance-signal high-pass filter 22 is supplied to a peak detecting circuit 23 where the maximum amplitude of the frequency spectral component is converted into a d.c. voltage. The d.c. voltage is input to a comparator 24 where the d.c. voltage is compared with a reference voltage V to produce an error voltage. The error voltage is negatively fed back to the high-frequency variable-peaking amplifier 34. Thus the spectrum of the luminance signal to be reproduced in the television receiver 43 is made uniform by regulating the high-frequency component of the video signal in the video recording/reproducing apparatus to thereby prevent the occurrence of the overshoot and the like.

If the synchronous outputs separated in the video recording/reproducing apparatus and by way of the television receiver are not in phase, the output from the high-frequency variable-peaking amplifier 34 is input to the luminance-signal high-pass filter 22. Then the output from the luminance-signal high-pass filter 22 is passed through the peak detecting circuit 23 and the comparator 24 to form a negative feedback loop to the high-frequency variable-peaking amplifier 34. This circuit configuration is the same as the circuit shown in the fourth embodiment, and therefore the spectrum of the luminance signal in the high-frequency range can uniformly be regulated.

In this way, when the synchronous outputs separated in the video recording/reproducing apparatus and by way of the television receiver are in phase, the spectrum of the luminance signal to be reproduced in the television receiver is controlled to be uniform by involving both the characteristics of the video side and the television side, in place of the output characteristics on only the video side. As a result, it is possible to reproduce an improved and sharp image that is suitable to the quality of image in the individual television receiver.

Embodiment 6

Figure 15:
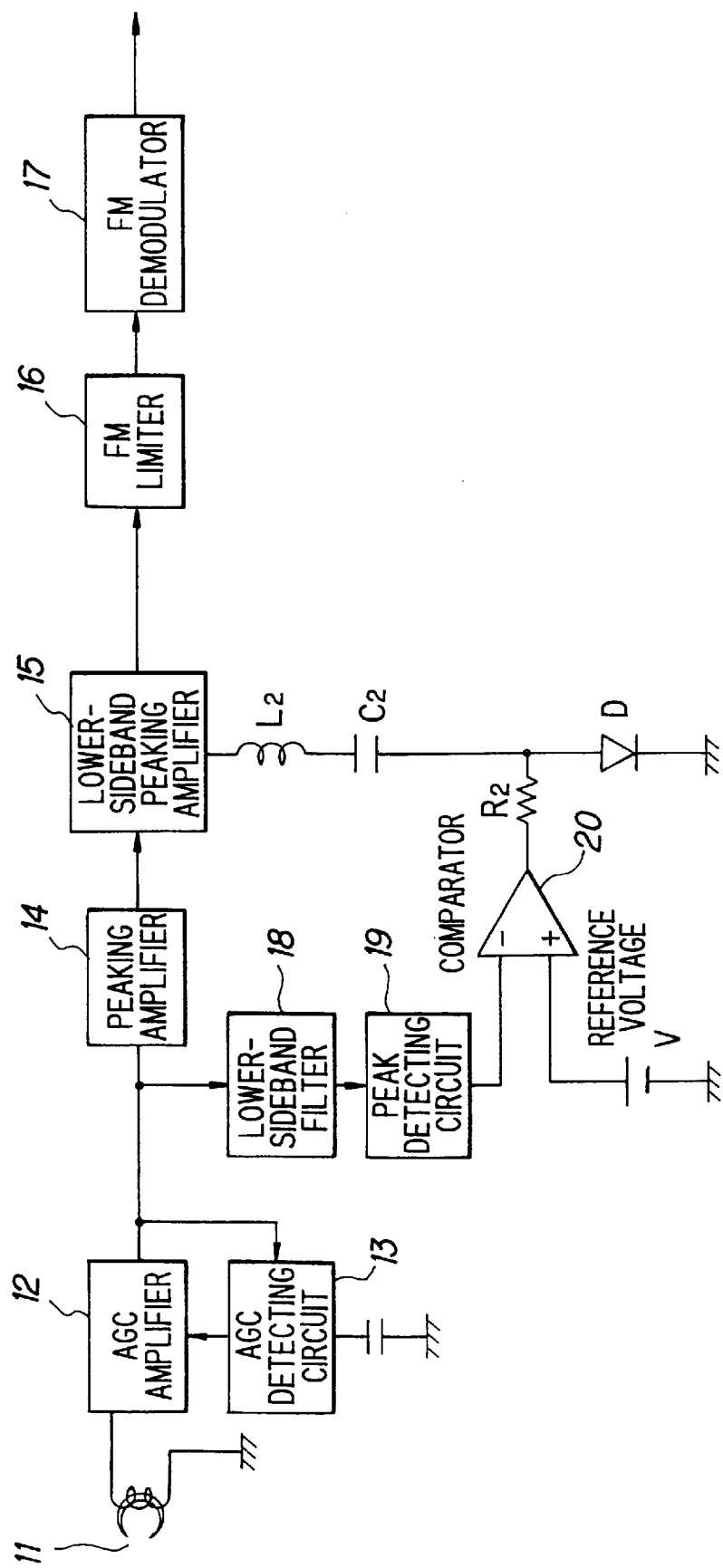
FIG. 15 is a block diagram showing a sixth embodiment of an automatic image quality-controlling device in accordance with the invention.

FIG. 15 is a block diagram showing a sixth embodiment of an automatic image control device in accordance with the invention. The output FM signal from the video head 11 is amplified in an AGC amplifier 12 to a uniform amplitude level. Then the amplified signal is supplied to a peaking amplifier 14, then passed through a lower-sideband variable-peaking amplifier 15, an FM limiter 16 and an FM demodulator 17 to be output as the luminance signal to be processed to the next stage. The output signal from the AGC amplifier 12 is supplied to a lower-sideband filter 18 made up of a low-pass filter or band-pass filter, through which the amplitudes of the frequency spectral component below the carrier wave of the FM signal are adjusted to substantially the same level. The output from the lower-sideband filter 18 is input to a peak detecting circuit 19 where the maximum amplitude of the frequency spectral component is converted into a d.c. voltage. This d.c. voltage is input to a comparator 20 where the signal is compared to a reference voltage V so as to produce an error voltage. This error voltage is input via a register $R_2$ to the lower-sideband variable-peaking amplifier 15. The application of the error voltage varies the impedance of the diode D. That is, the circuit is constructed such that the peaking quantity for the lower sideband around 1.5 MHz can be varied in response to the error voltage.

As a result, the output from the lower-sideband variable-peaking amplifier 15 is controlled in accordance with the lower-sideband level of the output from the AGC amplifier 12. That is, if the lower-sideband level of the output from the AGC amplifier 12 is low, the loop circuit functions so that the lower-sideband level is increased. When the lower-sideband level is too great, the loop circuit functions so that the level is decreased. In other words, the video image content reproduced from video tape is automatically controlled such that a video image having low sharpness is enhanced in sharpness so as to present hard contrast while a video image having too hard contrast is made to have soft contrast so that the black-and-white phenomenon will not occur. Therefore, since regardless of the quality of image of the video image source, the levels of the frequency spectrum of the reproduced signal are regulated to be uniform, it is possible to constantly produce video images with high quality if the frequency level is set up to present best quality of image.

Embodiment 7

The apparatus of the first embodiment operates so that the signal is made to have the same spectrum regardless of either the SP mode or the LP mode of the VCR and the whole stream of the signal is reproduced as high contrast images. However, there are cases where the tape recorded in the LP mode contains some portions which were recorded with demagnetization to present low output. For example, there is case where magnetic particle coating has been peeled off in some part of the tape. Even in such a case, the portion with low output is compensated so that the portion with the coating peeled off is reproduced clearly. Therefore, if the tape output is low, it is better to reduce the sharpness to some extent. This embodiment offers an automatic image quality-controlling device to be designed to effect such control.

Figure 16:
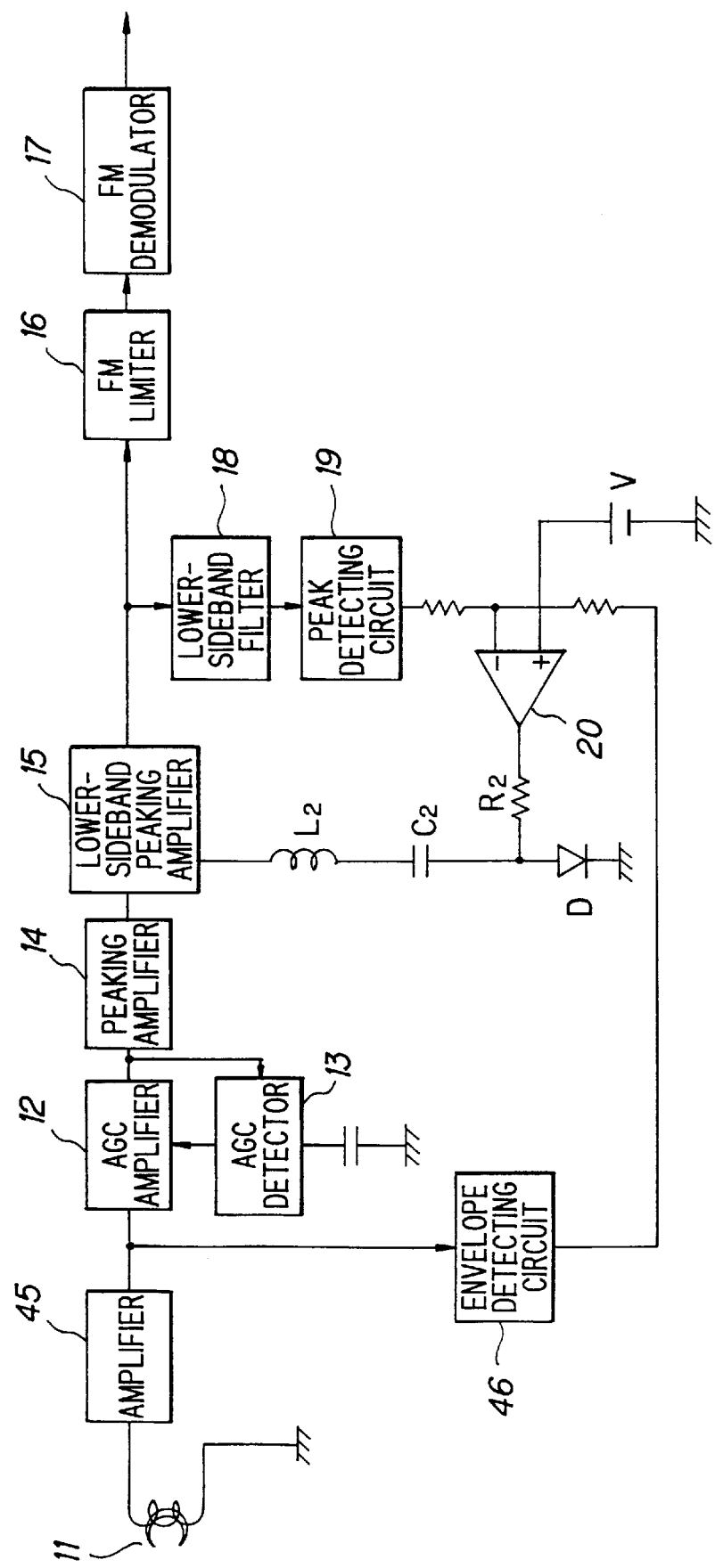
FIG. 16 is a block diagram showing a seventh embodiment of an automatic image quality-controlling device in accordance with the invention.

FIG. 16 is a block diagram showing a seventh embodiment of an automatic image quality-controlling device in accordance with the invention. The configuration of the device is almost the same with the circuit shown in the first embodiment. The difference is that the output signal from a video head 11 is amplified by an amplifier 45 and the amplified signal is supplied to an envelope detecting circuit 46 and the output from the peak detecting circuit 19 is overlaid with the detected signal so as to apply the partial voltage to a comparator 20. Accordingly, the amplification factor for the lower-sideband is low if the envelope-detected voltage is low, whereas the amplification factor for the lower-sideband becomes high as the envelope-detected voltage is increased. Thus, it is possible to vary the amplification factor for the lower-sideband in conformity with the level of the output reproduced by the video head, whereby it is possible to inhibit the sharpening function of those images which are recorded on tape at low output levels and need not be much intensified in sharpness.

Embodiment 8

Figure 17:
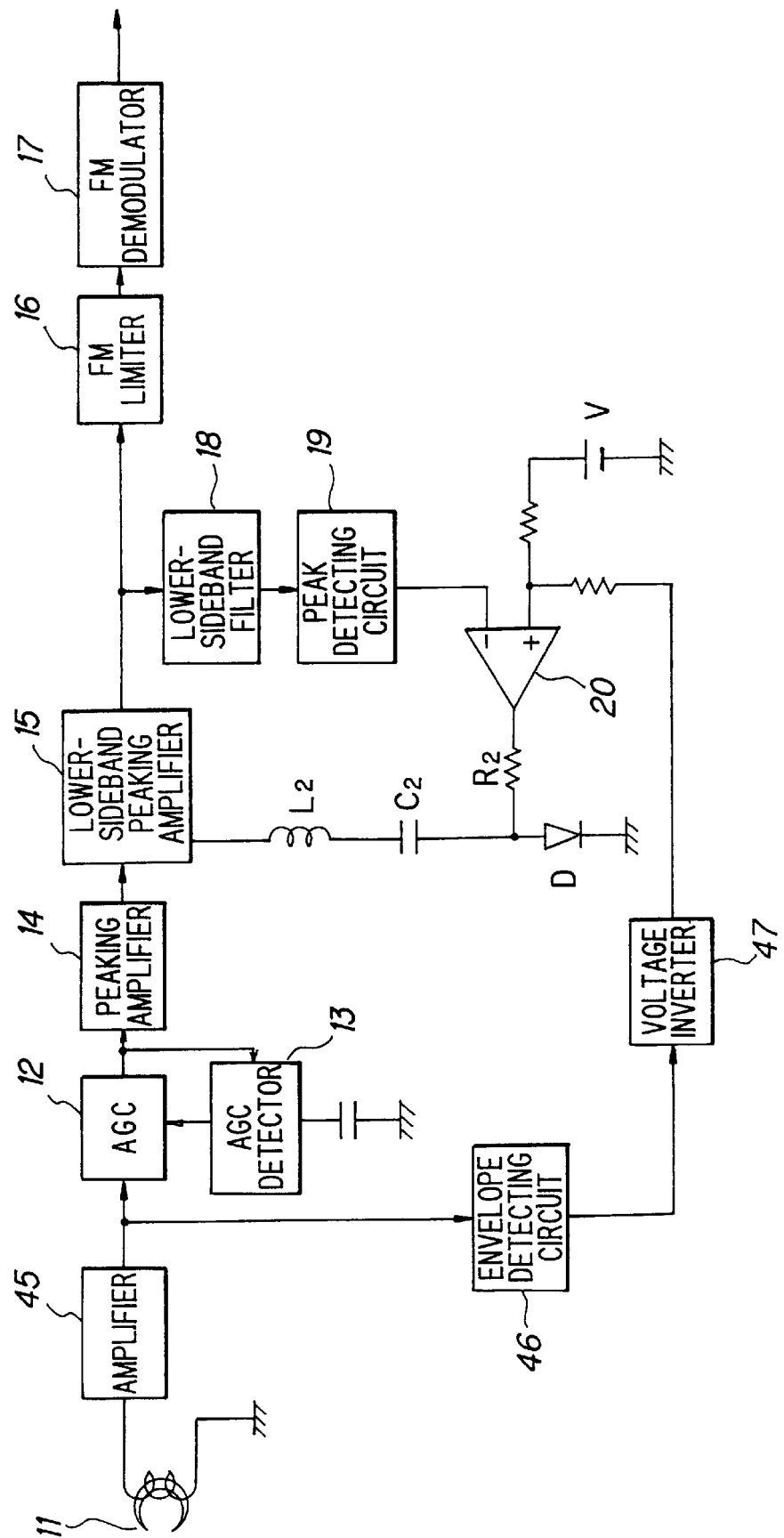
FIG. 17 is a block diagram showing an eighth embodiment of an automatic image quality-controlling device in accordance with the invention.

FIG. 17 is a block diagram showing an eighth embodiment of an automatic image quality-controlling device in accordance with the invention. The configuration of the device is almost the same with that of the seventh embodiment. The difference is that the output from an envelope detecting circuit 46 is inverted by an voltage inverting circuit 47 and the output is overlaid with a reference voltage from a comparator 20.

Thus, although there is a difference that the reference voltage from the comparator 20 is varied in conformity with the envelope-detected voltage, the same effect obtained in the seventh embodiment can be attained by inverting the envelope-detected voltage in the voltage inverting circuit 47.

Embodiment 9

In the sixth embodiment, as the amplitude of the lower sideband is increased, the impedance across the diode lowers and therefore the resonance Q-factor becomes high. As a result, the level of peaking sharply rises only at the central frequency of the peaking. This sharp rise may cause unwanted phenomena such as ringing etc. This embodiment is designed to attain the control for preventing the above defect.

Figure 18:
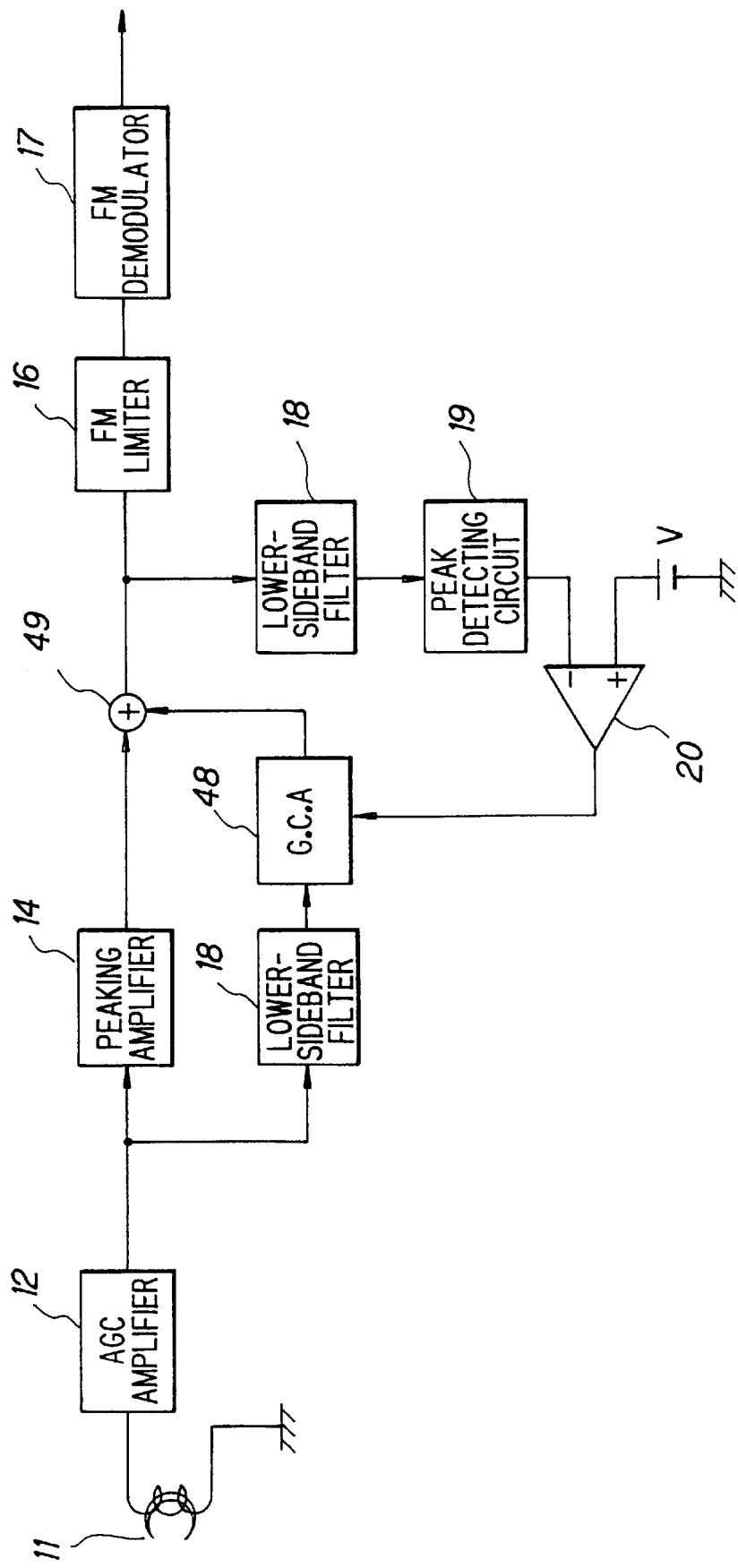
FIG. 18 is a block diagram showing a ninth embodiment of an automatic image quality-controlling device in accordance with the invention.

FIG. 18 is a block diagram showing a ninth embodiment of an automatic image quality-controlling device in accordance with the invention. In the figure, the lower-sideband of the FM signal output from an AGC amplifier 12 is extracted using a lower-sideband filter 18. The thus extracted signal is supplied to a gain control amplifier (GCA) 48 where the amplitudes of the lower-sideband spectrum are controllably varied by the voltage control. In this operation, the level of the amplitudes is set at a level just below the threshold above which the black-and-white reversal will occur. The thus gain-controlled lower sideband is mixed in a mixing circuit 49 with the output from a peaking amplifier 14. Again, the lower-sideband is extracted from the mixer output by another lower-sideband filter 18 and supplied to a peak detecting circuit 19 where the maximum amplitude of the extracted lower-sideband spectrum is converted into a d.c. voltage. The obtained d.c. voltage is compared with a reference voltage in a comparator 20 to output an error voltage. This error voltage being output from the comparator 20 is adapted to control the gain control amplifier 48.

Thus, since the lower-sideband spectrum of the input FM signal being input to an FM limiter circuit 16 is regulated to a substantially uniform level by using the gain-controllable amplifier, it is possible to make the Q-factor of the resonance circuit unchanged. As a result it is possible to prevent the occurrence of the sharp rise of the signal level only at a local frequency and therefore it is possible to obtain sharp images free from unwanted defects due to ringing etc.

INDUSTRIAL APPLICABILITY

As has been described heretofore, in accordance with the automatic image quality-controlling device of the invention, since the amplitudes of the lower sideband spectrum of the FM signal are regulated to be set at a uniform level which allows the best S/N characteristics and the optimum resolution, it is possible to produce sharp images. This feature is advantageous for the video signal recording and reproducing apparatuses such as VCRs, video cameras with a built-in VCR and the like.

What is claimed is:

1. An automatic image control device comprising:
   a lower-sideband variable-peaking circuit which receives an amplified FM signal that is output from a video head and that has had its frequency spectrum shifted to prevent the occurrence of black-and-white reversal phenomenon, wherein the peaking circuit peaks the lower sideband of the FM signal while maintaining an amplitude ratio between the lower-sideband and carrier wave of the FM signal constant;
   a lower-sideband filter for extracting the lower-sideband spectral component from the FM signal subjected to peaking;
   a comparator for comparing a d.c. voltage corresponding to a maximum detected amplitude of the extracted lower-sideband component with a reference voltage to generate an error voltage, wherein the error voltage is fed back to the lower-sideband variable-peaking circuit to regulate jutting amplitudes in the frequency spectrum of the lower-sideband to a uniform value, thereby improving sharpness of an image; and
   an envelope detecting circuit for detecting the envelope of the voltage of the FM signal output from the video head, wherein the d.c. voltage corresponding to a maximum detected amplitude of the extracted lower-sideband component is overlain by the envelope-detected voltage.

2. An automatic image control device according to claim 1 further comprising a resonant circuit including a coil, capacitor and diode, the resonant circuit connected to said lower-sideband variable-peaking circuit, wherein the error voltage output from said comparator is applied to the diode, and the amplification factor for the lower sideband is regulated by varying impedance as current changes through the diode.

3. An automatic image control device comprising:
   a lower-sideband variable-peaking circuit which receives an amplified FM signal that is output from a video head and that has had its frequency spectrum shifted to prevent the occurrence of black-and-white reversal phenomenon, wherein the peaking circuit peaks the lower sideband of the FM signal;

a lower-sideband filter for extracting the lower-sideband spectral component from the FM signal;

a comparator for comparing a d.c. voltage corresponding to a maximum detected amplitude of the extracted lower-sideband component with a reference voltage to generate an error voltage, wherein the error voltage is fed back to the lower-sideband variable-peaking circuit so that the amplitude ratio between the lower-sideband and carrier wave of the FM signal is constant, thereby enabling reproduction of images at high resolution; and an envelope detecting circuit for detecting the envelope of the voltage of the FM signal output from the video head, wherein the d.c. voltage corresponding to a maximum detected amplitude of the extracted lower-sideband component is overlain by the envelope-detected voltage.

4. An automatic image control device according to any one of claims 1 or 3, further including an AGC amplifier for amplifying the FM signal output from the video head, wherein the output of the AGC amplifier is fed back to the AGC amplifier to provide a uniform amplitude spectrum.

5. An automatic image control device according to any one of claims 1 and 3, further including a peak detecting circuit for converting the maximum amplitude of the extracted lower-sideband spectral component into the d.c. voltage.

6. An automatic image control device comprising:

an AGC amplifier for amplifying a reproduced FM signal output from a video head to provide a uniform amplitude spectrum;

a first lower-sideband variable-peaking circuit for peaking the lower sideband of the reproduced FM signal;

a recording equalizer circuit for regulating a recording FM signal limited by a limiter so that the recording signal has a predetermined frequency characteristic;

a second lower-sideband variable-peaking circuit for peaking the lower sideband of the recording FM signal;

a lower-sideband filter for extracting the lower-sideband spectral component from the FM signal;

a peak detecting circuit for converting the maximum amplitude of the lower-sideband spectral component of the extracted FM signal into a d.c. voltage;

a comparator for comparing the d.c. voltage with a reference voltage to selectively output an error voltage to the first and second lower-sideband variable-peaking circuits; and a switch disposed between the lower-sideband filter and the first and second lower-sideband variable-peaking circuits, wherein the first lower-sideband variable-peaking circuit is connected with the lower-sideband filter by the switch during a reproducing mode to form a feedback loop, while the second lower-sideband variable-peaking circuit is connected with the lower-sideband filter by the switch during the recording mode to form another feedback loop.

7. An automatic image control device comprising:

an AGC amplifier for amplifying an FM signal output from a video head to provide a uniform amplitude spectrum;

an FM demodulating circuit for demodulating the amplified FM signal;

a luminance-signal high-pass variable-peaking circuit for peaking the high-frequency spectral component of the luminance signal output from said FM demodulating circuit;

a luminance-signal high-pass filter for extracting the high-frequency spectral component of the luminance signal from a video signal which has been input to a video input terminal on a VCR side from the video output terminal on a television receiver side;

a peak detecting circuit for converting the maximum amplitude of the extracted luminance signal into a d.c. voltage; and a comparator for comparing the d.c. voltage with a reference voltage to generate an error voltage, wherein the error voltage fed back to the luminance-signal high-pass variable-peaking circuit to form a feedback loop, so that the spectrum of the luminance signal reproduced on the television receiver is uniform.

8. A method for use in an automatic image control device to produce sharp images, comprising:

(a) amplifying an FM signal output from a video head with an amplifier;

(b) detecting an envelope of the voltage of the FM signal output from the video head;

(c) peaking the lower-sideband of the FM signal output from step (a) while maintaining an amplitude ratio between the lower-sideband and carrier wave of the FM signal constant;

(d) extracting a lower-sideband spectral component from the FM signal subjected to step (c);

(e) converting the maximum amplitude of the extracted lower-sideband spectral component to a d.c. voltage;

(f) overlaying the d.c. voltage with the envelope-detected voltage to form a partial d.c. voltage; and (g) comparing the partial d.c. voltage with a reference voltage to generate an error voltage, wherein the error voltage is fed back through a feedback loop to step (c) so that amplitudes of the lower-sideband spectrum of the FM signal output from step (c) are substantially uniform, thereby improving sharpness of an image.

9. A method according to claim 8, further including:

(h) feeding back the FM signal output from step (a) to the amplifier to provide a uniform amplitude spectrum.

10. An automatic image control device comprising:

a peaking amplifier which receives an amplified FM signal that has been output from a video head and amplified, and which shifts the amplified signal to prevent the occurrence of black-and-white reversal phenomenon;

a lower-sideband variable-peaking circuit to peak the lower sideband of the amplified and shifted FM signal while maintaining an amplitude ratio between the lower-sideband and carrier wave of the FM signal constant;

a lower-sideband filter for extracting the lower-sideband spectral component from the FM signal subjected to peaking;

a comparator for comparing a d.c. voltage corresponding to a maximum detected amplitude of the extracted lower-sideband component with a reference voltage to generate an error voltage, wherein the error voltage is fed back to the lower-sideband variable-peaking circuit to regulate jutting amplitudes in the frequency spectrum of the lower-sideband to a uniform value, thereby improving sharpness of an image; and an envelope detecting circuit for detecting the envelope of the voltage of the FM signal output from the video head, wherein the d.c. voltage corresponding to a maximum detected amplitude of the extracted lower-sideband component is overlain by the envelope-detected voltage.

11. A method for use in an automatic image control device to produce sharp images, comprising:

amplifying an FM signal input from a video head;

detecting an envelope of the voltage of the FM signal input from the video head;

shifting the amplified FM signal to prevent the occurrence of black-and-white reversal phenomenon;

peaking the lower sideband of the amplified and shifted FM signal while maintaining an amplitude ratio between the lower-sideband and carrier wave of the FM signal constant;

extracting the lower-sideband spectral component from the FM signal subjected to peaking;

overlaying a d.c. voltage corresponding to a maximum detected amplitude of the extracted lower-sideband component with the envelope-detected voltage to form a partial d.c. voltage; and comparing the partial d.c. voltage with a reference voltage to generate an error voltage, wherein the error voltage is fed back to regulate jutting amplitudes in the frequency spectrum of the lower-sideband to a uniform value, thereby improving sharpness of an image.

* * * * *

UNITED STATES PATENT AND TRADEMARK OFFICE
CERTIFICATE OF CORRECTION

PATENT NO. : 6,101,312
DATED : August 8, 2000
INVENTOR(S) : Mitsuo Funayama

It is certified that error appears in the above-identified patent and that said Letters Patent is hereby corrected as shown below:

On title page, the following Foreign Application Priority Data should appear as follows:

JAPAN 7-139662 June 6, 1995

Signed and Sealed this

Twelfth Day of June, 2001

*Attest:*

*Nicholas P. Godici*

*Attesting Officer*

NICHOLAS P. GODICI
*Acting Director of the United States Patent and Trademark Office*